United States Patent
Rinaldis et al.

(10) Patent No.: US 7,107,343 B2
(45) Date of Patent: Sep. 12, 2006

(54) METHOD AND APPARATUS FOR IMPROVED RAID 1 WRITE PERFORMANCE IN LOW COST SYSTEMS

(75) Inventors: Joseph M. Rinaldis, Superior, CO (US); Bahareh Ghaffari, Boulder, CO (US)

(73) Assignee: Adaptec, Inc., Milpitas, CA (US)

( * ) Notice: Subject to any disclaimer, the term of this patent is extended or adjusted under 35 U.S.C. 154(b) by 769 days.

(21) Appl. No.: 09/904,704

(22) Filed: Jul. 12, 2001

(65) Prior Publication Data

US 2003/0014520 A1     Jan. 16, 2003

(51) Int. Cl.
*G06F 11/00* (2006.01)
(52) U.S. Cl. ............................. 709/225; 710/110
(58) Field of Classification Search ............... 709/225, 709/223, 238, 245; 710/20, 29, 52, 7, 110; 712/1, 10, 25, 28; 700/2, 28; 711/114
See application file for complete search history.

(56) References Cited

U.S. PATENT DOCUMENTS

| | | | | |
|---|---|---|---|---|
| 5,754,780 A | * | 5/1998 | Asakawa et al. | 709/208 |
| 6,065,087 A | * | 5/2000 | Keaveny et al. | 710/315 |
| 6,065,096 A | | 5/2000 | Day et al. | 711/114 |
| 6,260,079 B1 | * | 7/2001 | White | 710/8 |
| 6,389,493 B1 | * | 5/2002 | Barkley et al. | 710/110 |
| 6,801,954 B1 | * | 10/2004 | Rust et al. | 710/7 |
| 6,807,581 B1 | * | 10/2004 | Starr et al. | 709/250 |
| 6,813,688 B1 | * | 11/2004 | Wu et al. | 711/114 |

* cited by examiner

*Primary Examiner*—Jeffrey Pwu
*Assistant Examiner*—Jude Jean-Gilles
(74) *Attorney, Agent, or Firm*—Sheridan Ross P.C.

(57) ABSTRACT

A method and an apparatus for providing a RAID 1 controller subsystem are provided. According to the invention, data or commands issued by a host system and addressed to a transport master are provided to a system bus interface. The system bus interface simultaneously provides the data or commands to the transport master and to a transport slave. The data or commands are then passed to the first and second devices substantially simultaneously. In a normal RAID 1 mode of operation, data retrieved from the first device is passed to the host system by the transport master. In a failover RAID 1 mode of operation, the data retrieved from the first device is not provided to the transport master. Instead, a multiplexer is operated to provide the transport master with the data retrieved from the second device. The invention also allows the controller to operate in a non-RAID 1 mode. The non-RAID 1 operating mode is enabled by operating the transport slave such that it does not act with respect to commands and data that are addressed to the transport master. According to the non-RAID 1 mode of operation, data for storage on the second device must be addressed to the transport slave.

18 Claims, 4 Drawing Sheets

METHOD AND APPARATUS FOR IMPROVED RAID 1 WRITE PERFORMANCE IN LOW COST SYSTEMS

FIELD OF THE INVENTION

The present invention relates to RAID 1 devices. In particular, the present invention relates to a low cost system for providing improved RAID 1 performance.

BACKGROUND OF THE INVENTION

Computer systems require reliable storage for large amounts of data. Often, redundant arrays of independent (or inexpensive) disks (RAID) devices are used to provide such storage. In general, RAID devices involve storing data on a plurality of individual hard disk drives. The use of RAID techniques increases the reliability and/or speed of data storage and retrieval.

There are various schemes, or RAID levels, according to which a number of hard disk drives or other storage devices may be used in connection with the storage of data. One such scheme is known as RAID level 1 (or RAID 1).

In a RAID 1 system, the information stored on a first drive is mirrored by a second drive. That is, a duplicate copy of the data stored on the first drive is maintained on a second drive. Accordingly, a RAID 1 system requires a minimum of two independent drives. A RAID 1 system is fault tolerant because, if data is lost from one of the drives, the duplicate copy of that data can most likely be retrieved from the second drive.

With reference now to FIG. 1, a conventional system 100 for implementing a RAID 1 disk array is depicted. In general, the system 100 includes a host processor 104 interconnected to a conventional RAID 1 controller 108 by a system bus 112. The conventional RAID 1 controller 108 is in turn connected to a first device, labeled device 0 116, and to a second device, labeled device 1 120 or 122.

The conventional RAID 1 controller 108 generally includes a local processor 124 a first device controller, labeled controller A 128, and may include a second device controller, labeled controller B 132. The conventional RAID 1 controller 108 also includes a bridge 136 for transmitting and receiving data and commands over the system bus 112.

During a data storage operation, the conventional controller 108 receives data for storage off the system bus 112. The local processor 124 sends that data to the first controller 128, which constructs a block of data, and provides the block of data to the first device 116 for storage. After a successful storage operation, a signal verifying completion of the write operation is passed from the first device 116 to the first device controller 128. The first device controller 128 then signals the completion of the write operation to the local processor 124.

After the local processor 124 has sent the data for storage to the first device controller 128, it sends a second copy of the data for storage to the second device controller 132 for storage on the second device 120. Alternatively, for instance, where a second controller 132 is not provided, the local processor 124 may send the second copy of data to the first controller 128 for storage on the alternate second device 122. It should be noted that even if two devices 116 and 122 are interconnected to a single controller 128, data must still be written to the devices 116 and 122 sequentially. The local processor 124 may obtain the second copy of the data for storage by retrieving the copy from memory interconnected to the system bus 112. Alternatively, the local processor 124 may obtain a second copy by storing a copy in a memory cache associated with the local processor 124 and later moving the copy to the appropriate controller. After the copy of the data for storage has been provided to the second device controller 132 (or the first device controller 128), that data is stored on the second device 120 (or 122) in a procedure that follows substantially the same steps as are involved in storing the first copy of data on the first device 116, as described above.

According to other prior art RAID 1 controllers, no local processor 124 may be provided. In such instances, the host processor 220 generally controls sequentially providing copies of the data for storage on the first and second devices 116 and 120 (or 122).

From the above description, it can be appreciated that conventional RAID 1 controller systems store data in the devices included in the array of disks in serial fashion. That is, only after a copy of the data that will be stored in the first device has been provided to a device controller associated with that first device is a second copy obtained and provided to the device controller associated with the second device. Therefore, with conventional RAID 1 controllers, more time is required to store data than if a single physical drive is used to store data.

Accordingly, it would be advantageous to provide a RAID 1 controller that was capable of storing a primary and a mirror copy of data on a pair of devices substantially simultaneously. Furthermore, it would be advantageous to provide such a RAID 1 controller that did not require sequentially providing a first copy of data for storage on the first device and a second copy of data for storage on the second device, and that required relatively little intervention by a processor. It would also be advantageous to provide such a RAID 1 controller that was reliable in operation, and that was inexpensive to implement.

SUMMARY OF THE INVENTION

In accordance with the present invention, a method and an apparatus for providing a RAID 1 controller subsystem are provided. The present invention generally allows commands or data to be provided to a plurality of storage devices simultaneously. Accordingly, the present invention provides a RAID 1 controller that is capable of operating at higher speeds than conventional RAID 1 controllers.

According to one embodiment of the present invention, data is received from a host at a transport master through a system bus interface. The data is provided to first and second device interfaces substantially simultaneously. From the device interfaces, the data is stored in first and second devices interconnected to their respective interfaces in a single, point to point relationship, substantially simultaneously.

According to a further embodiment of the present invention, in response to a request for data from a host that is provided to a transport master, data is retrieved from first and second devices substantially simultaneously. In a normal operating mode, data retrieved from the first device is passed to the transport master and in turn to the host. Data retrieved from the second device is not passed to the transport master, and is not provided to the host. However, data integrity is validated to ensure data consistency in both devices.

According to a further embodiment of the present invention, in a failover mode, data retrieved from the first device, if any, is not provided to the transport master or the host computer. However, data retrieved from the second device is passed to the transport master and is provided to the host.

According to still another embodiment of the present invention, the controller of the present invention is capable of operating in a non-RAID 1 enabled mode. In the non-RAID 1 enabled mode, a host may access a first device through a transport master. The host may also address a second device, independently of the first device through a transport slave interconnected to the second device.

In accordance with still another embodiment of the present invention, the controller is implemented by providing a transport master and a transport slave interconnected to a system bus by a system bus interface. In RAID 1 operation, commands and data sent to the transport master are also received and acted upon by the transport slave. Therefore, the commands and data may be provided to first and second devices interconnected to the transport slave and transport master respectively by single point to point connections, substantially simultaneously. Data read from the first device is made available at the transport master during normal RAID 1 operation. By selectively enabling a failover mode, a multiplexer may be switched, such that the transport master is provided with data from the second device.

In accordance with another embodiment of the present invention, a transport master and a transport slave connected to a system bus interface are provided. The transport master and the transport slave each have a unique address to allow for the independent operation of two interconnected devices. In a RAID 1 operating mode, the transport slave receives and acts on commands and data that are addressed to the transport master. Accordingly, data and commands provided to a first device (interconnected to the transport master) are also provided to the second device (interconnected to the transport slave). In a non-RAID 1 operating mode, the transport slave does not act on commands and data addressed to the transport master. In this non-RAID 1 enabled operating mode, the host computer may therefore selectively access the first or second device by addressing commands or data to the transport master and transport slave independently.

Based on the foregoing summary, a number of salient features of the present invention are readily discerned. A method and apparatus for providing a RAID 1 controller are provided. The RAID 1 controller of the present invention selectively provides full RAID 1 functionality, or non-RAID 1 control of attached devices. Furthermore, the RAID 1 controller of the present invention provides data and commands to the devices under its control substantially simultaneously, improving the performance of the controller as compared to conventional RAID 1 controllers.

Additional advantages of the present invention will become readily apparent from the following discussion, particularly when taken together with the accompanying drawings.

DETAILED DESCRIPTION

Figure 1:
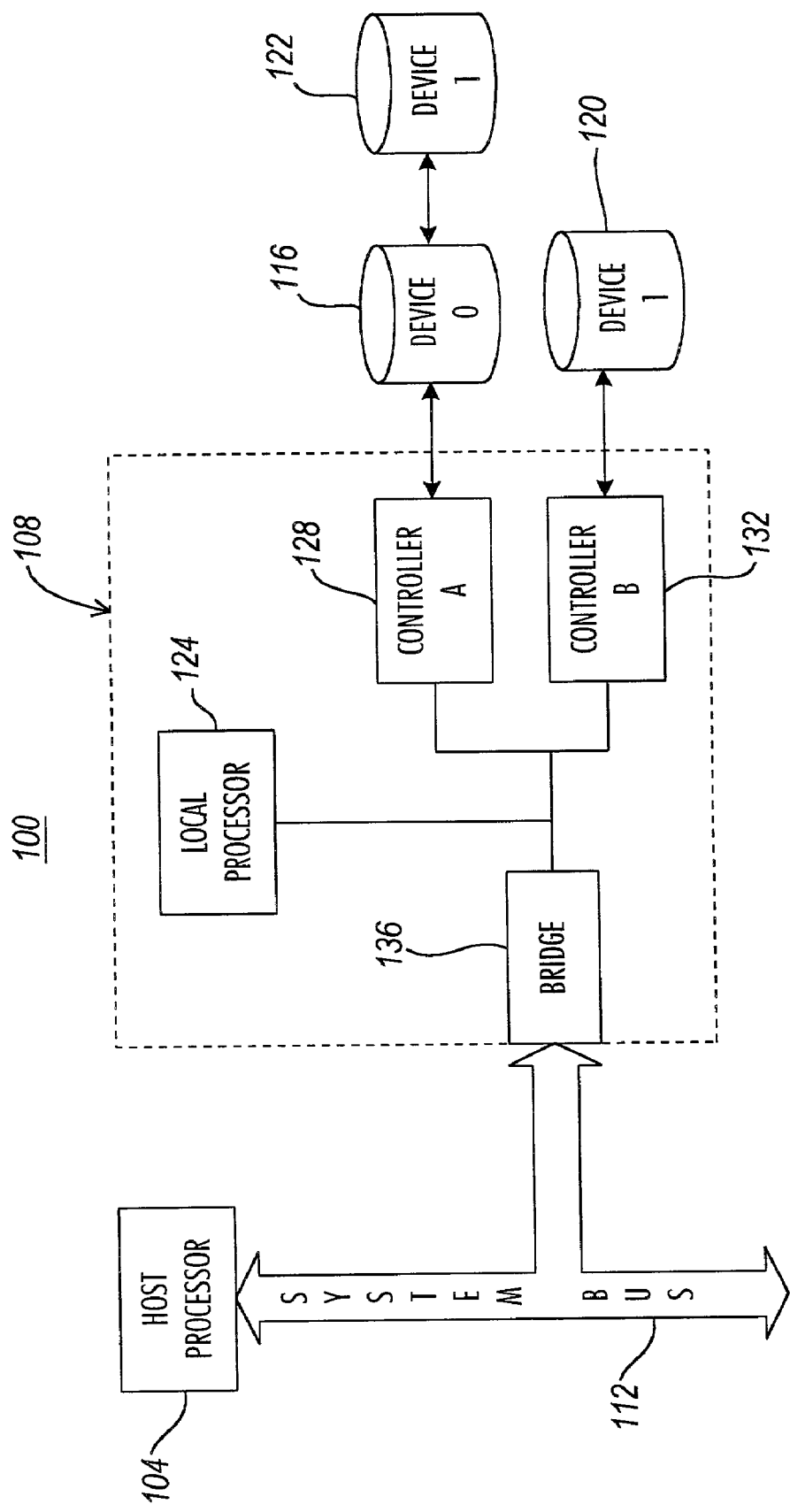
FIG. 1 is a block diagram illustrating components of a RAID 1 controller in accordance with the prior art.
Figure 2:
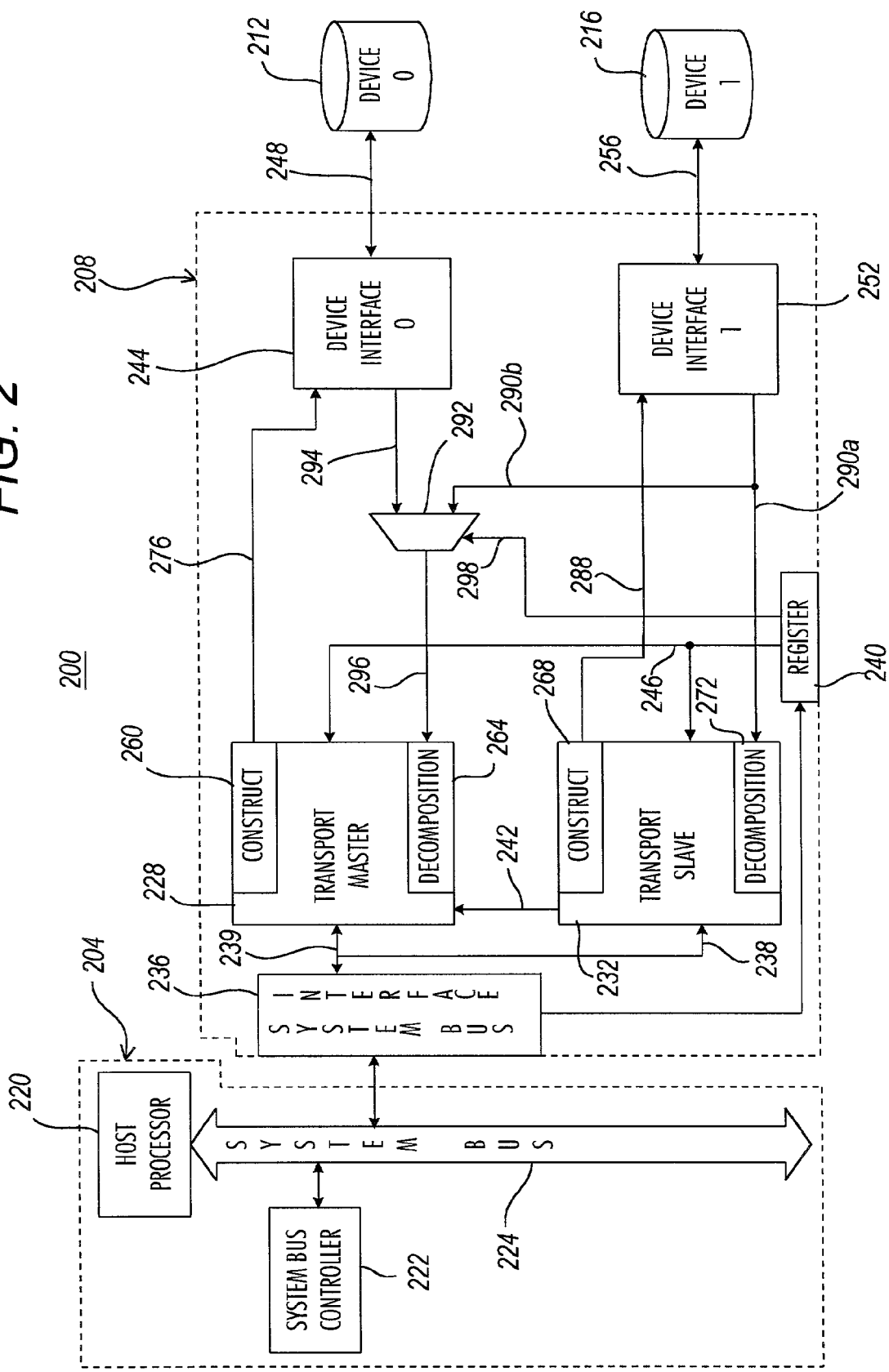
FIG. 2 is a block diagram illustrating components of a RAID 1 controller in accordance with an embodiment of the present invention.

With reference now to FIG. 2, a system 200 having a RAID 1 controller 208 in accordance with an embodiment of the present invention is illustrated. In general, the system 200 includes a host system 204, the RAID 1 controller 208, a first storage device 212, and a second storage device 216.

The host system 204 generally includes a host processor 220, a system bus controller 222 and a system bus 224. The host processor 220 may include any processor suitable for general use computing, such as a PENTIUM, POWER PC or RISC processor, and any associated support circuitry, such as a system board. The system bus controller 222 may be provided separately, or may be integral to the system board or host processor 220. The system bus 224 may include any communication channel suitable for passing signals between interconnected computing devices or components. For example, the system bus 224 may include a peripheral component interface (PCI) bus.

The RAID 1 controller 208 generally includes a transport master 228 and a transport slave 232. The transport master 228 and the transport slave 232 are interconnected to the system bus interface 236 by an internal bus 238 having a Y 239 to provide signals from the system bus interface 236 to the transport master 228 and the transport slave 232 substantially simultaneously. The system bus interface 236 generally interfaces the transport master 228 and the transport slave 232 to the system bus 224. Furthermore, the transport master 228 and the transport slave 232 may each be uniquely addressed by the host system 204 through the system bus interface 236. The transport master 228 and the transport slave 232 may be interconnected to one another by a transport communication link 242. According to one embodiment of the present invention, the communication link 242 supports messages sent from the transport slave 232 to the transport master 228.

A register 240 may be interconnected to the system bus interface 236 for storing information related to the operation of the controller 208. The contents of the register may be provided to the transport master 228 and the transport slave 232 over the register signal line 246. The controller 208 additionally includes a first device interface 244 that interfaces the controller 208 to the first device 212 via a first interconnection 248. A second device interface 252 is interconnected to the second device 216 via a second interconnection 256. The interconnections 248 and 256 may be in accordance with any device interface protocol used to interconnect a device to a host system. For example, the interconnections may include a serial advanced technology attachment (SATA).

It will be appreciated that the RAID 1 controller 208 of the present invention has only one device 212 or 216 interconnected to each device interface 244 and 252. That is, each device 212 and 216 is in a single point to point relationship with its respective device interface 244 or 252. This configuration allows data to be directed to both of the devices 212 and 216 at substantially the same time, as will be explained in greater detail below.

In connection with an embodiment of the RAID 1 controller 208 for use with SATA interconnections, the transport master 228 includes construct 260 and decomposition 264 blocks. The transport slave 232 also includes construct 268 and decomposition 272 blocks. The construct blocks 260 and 268 generally serve to configure data, including commands, received at their respective transport 228 or 232 into a format or protocol utilized by the device interface 244 or 252 and the device 212 or 216. The decomposition blocks 264 and 272 generally serve to receive data or commands in the format or protocol utilized by the device interfaces 244 and 252 and the devices 212 and 216, and to unbundle that data for proper handling by their respective transport 228 or 232. In general, the transports 228 and 232 require construct 260 and 268 and decomposition 264 and 272 blocks because the data format or protocol utilized by the system bus 224 may be different from the protocol or format used by the device interfaces 244 and 252 and the devices 212 and 216.

An outgoing master signal line 276 extends from the transport master 228, and in particular from the construct block 260, to the first device interface 244. Accordingly, it can be appreciated that data may be passed from the transport master 228 to the first device 212 through the first device interface 244.

The construct block 268 of the transport slave 232 is interconnected to the second device interface 252 by the outgoing slave signal line 288. Accordingly, it can be appreciated that data may be passed from the transport slave to the second device 216 through the second device interface 252.

The second device interface 252 provides data retrieved from the second device 216 to the decomposition block 272 of the transport slave 232 over second device interface signal line 290a, and to a multiplexer 292 over second device interface signal line 290b. The multiplexer 292 also is provided with data retrieved from the first device 212 through the first device interface 244 over first device interface signal line 294. The multiplexer 292 may selectively interconnect either the second device interface signal line 290b or the first device interface signal line 294 to the decomposition block 264 of the transport master 228 over the multiplexer output line 296.

The multiplexer 292 is operated in response to a failover signal provided over failover signal line 298. In general, the failover signal may be received from the host processor 220 at the system bus interface 236 and stored in a first location in the register 240. The failover signal may be asserted by the host processor 220 if the first device 212 experiences a failure. When the failover signal is asserted, the multiplexer 292 is switched so that data may be retrieved from the second device 216 by the host system 204 through the transport master 228. Accordingly, it can be appreciated that in a failover mode, when the second multiplexer 292 is operated to interconnect the second device interface signal line 290b to the transport master 228, the second device interface 252 is capable of sending data retrieved from the second device 216 to the transport master 228 and to the transport slave 232 simultaneously. The data is provided to the transport slave 232 in order to verify the data integrity of the second device 216. Furthermore, it can be appreciated that in a non-failover mode, when the second multiplexer 292 is operated to interconnect the first device interface signal line 294 to the second multiplexer output line 296, the first device interface 244 will send data to the transport master 228.

Figure 3:
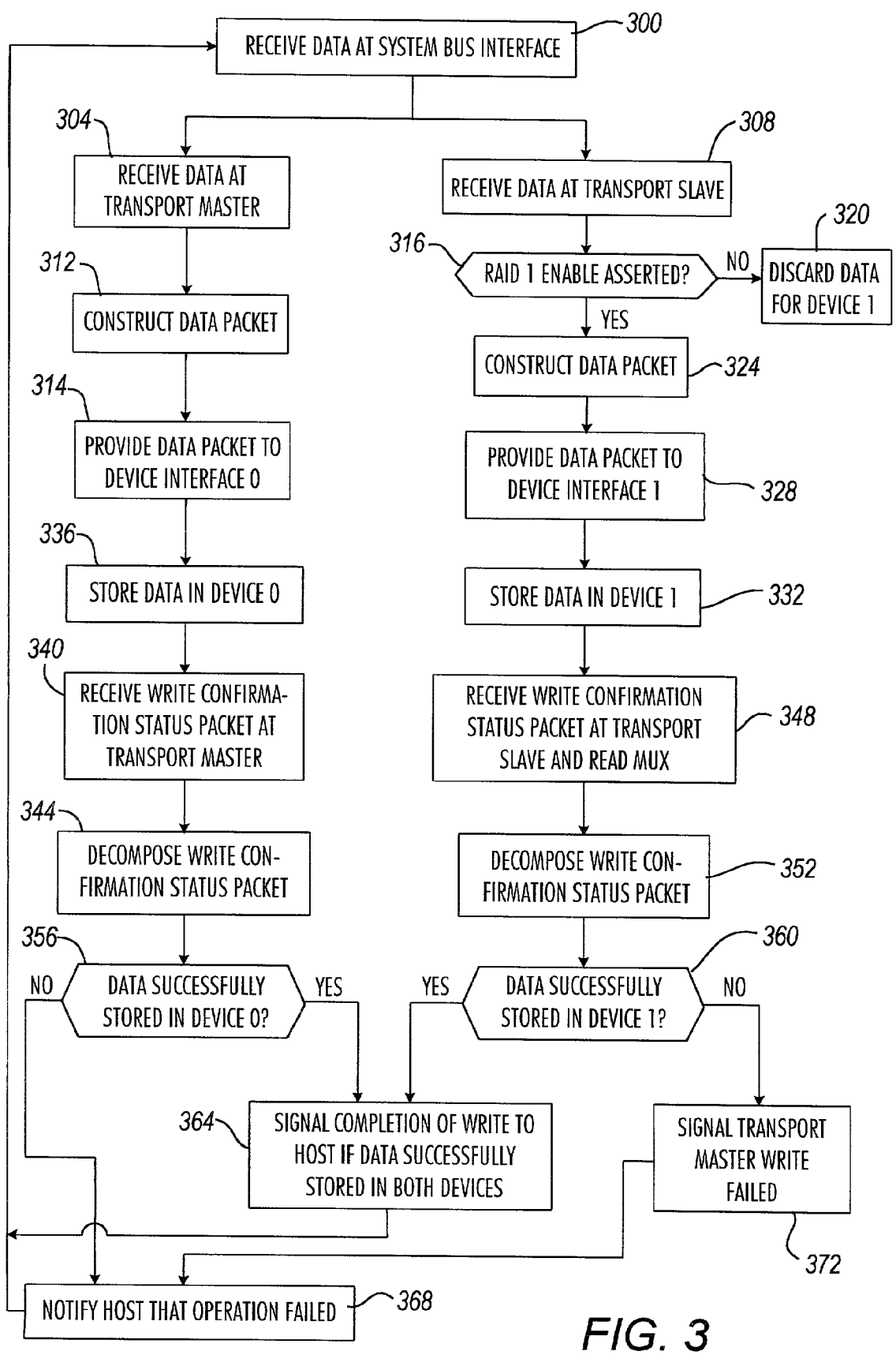
FIG. 3 is a flow chart illustrating the operation of an embodiment of the present invention in connection with a write operation.

With reference now to FIG. 3, the operation of an embodiment of the present invention in connection with a write operation is illustrated. Initially, at step 300 the system bus interface 236 receives data for storage that is addressed to the transport master 228. In general, a write operation is preceeded by a command to prepare for the write operation. See FIG. 4 and the discussion related thereto for an explanation of how commands received at the system bus interface 236 are handled. The system bus interface 236 passes the data to the transport master 228 and the transport slave 232 substantially simultaneously. This is achieved by splitting the signal comprising the data at the Y 239 formed in the internal bus 238. To facilitate the receipt of a copy of the data addressed to the transport master 228, the transport slave 232 may configure itself to look like the transport master 228 to the internal bus 238. Accordingly, the transport master 228 receives the data (step 304) at substantially the same time the transport slave 232 receives the data (step 308). The transport master 228 then constructs a data block in the construct block 260 (step 312). In general, the construct block 260 formats the received data according to the protocol required by the device interface 244 and the device 212. For example, where the link 248 between the device interface 244 and the device 212 is established according to a serial ATA protocol, the construct block 260 provides the data as a frame information structure (FIS) packet. As will be understood by those of skill in the art, a frame information structure packet includes a start of frame indicator, the data payload, a cyclic redundancy check, and an end of frame signal. The data payload may include data for storage on a device 212 or command data. After the data has been suitably formatted, it is provided to the first device interface 244 (step 314).

As mentioned above, the data is delivered to the transport master 228 and to the transport slave 232 at substantially the same time. That is, apart from the influence of any propagation delays caused by different lengths in the branches of the internal bus 238, the data will be received at the transport master 228 and the transport slave 232 at the same time. Accordingly, it can be appreciated that two instances of the data packet are sent in parallel. This may be accomplished by, for example, as shown in FIG. 2, branching the signal sent to the transport master 228 and the transport slave 232 at the Y connector 239. The transport master 228 and the transport slave 232 may also be interconnected to the internal bus 238 in parallel. The data may be considered to arrive at the transport master 228 and the transport slave 232 at substantially the same time if one instance of the data arrives at the transport master 228 within less than about 1 system clock cycle from the time that a second instance of the data arrives at the transport slave 232.

With respect to the instance of the data provided to the transport slave 232, a determination is made as to whether RAID 1 operation has been enabled (step 316). In general, RAID 1 operation may be enabled in response to a signal received from the host processor 220. An instruction to enable RAID 1 operation may be stored in the register 240 and the contents of the register 240 provided to the transport master 228 and the transport slave 232 by the register signal line 246. If RAID 1 operation is not enabled, the instance of the data provided to the transport slave 232 is discarded (step 320).

If RAID 1 operation is enabled, the transport slave 232 acts on the data, even though that data is, in the present example, addressed to the transport master 228. Accordingly, when RAID 1 operation is enabled, the data addressed to the transport master 228 and received at the transport slave 232 is transformed by the transport slave 232 as required by the second device interface 252. For example, the construct block 268 of the transport slave 232 may format the received data as an FIS packet (step 324). Next, the data is provided to the second device interface 252 over the outgoing slave signal line 288 (step 328). The second device interface 252 then passes the data to the second device 216, and the data is stored on the second device 216 (step 332). Alternatively, if the data packet contains a command, the second device 216 may act upon the command. For example, a command requesting data from the second device 216 may be passed to the second device 216.

The instance of the data that is provided to the first device interface 244 is passed to the first device 212, and data contained in the data packet is stored on the first device 212 (step 336). If the data includes a command, the first device 212 may respond to the command.

From the above description, it can be appreciated that during RAID 1 operation the first 212 and second 216 devices are provided with instances of the data provided to the system bus interface 236 of the controller 208 at substantially the same time, apart from differences in arrival time due to propagation delays caused by variations in the different signal paths followed by the two instances of the data. In addition, the time at which data is successfully received by the devices 212 and 216 may differ due to rewrites necessitated by jitter. Furthermore, it can be appreciated that, according to this embodiment of the present invention, no processor or processing time is required to coordinate delivery of the data to the devices 212 and 216. It also can be appreciated that the instances of the data are not sent in series, but rather are provided to the transports 228 and 232, to the device interfaces 244 and 252, and in turn to the devices 212 and 216, in parallel.

With continued reference to FIG. 3, following a write operation, the first device 212 issues a write confirmation signal that is received at the transport master 228 as a status packet (step 340). In particular, the status packet containing the write confirmation passes from the first device 212 to the first device interface 244 over interconnection 248, and from the first device interface 244 to the read multiplexer 292 over the first device interface signal line 294. If a failover mode is not enabled, the read multiplexer 292 passes the status packet to the decomposition block 264 of the transport master 228 over read multiplexer output line 296. The status packet containing the write confirmation signal is then deconstructed by the decomposition block 264 of the transport master 228 (step 344).

Similarly, the second device 216 issues a status packet containing a write confirmation command that is passed to the second device interface 252. The second device interface 252 in turn outputs the status packet containing the write confirmation from the second device 216 along second device signal lines 290a and 290b. Accordingly, a first instance of the write confirmation status packet is provided to the decomposition block 272 of the transport slave 232, and a second instance of the status packet is received at the read multiplexer 292 (step 348). If a failover signal is not asserted, the read multiplexer 292 does not interconnect the second device interface output signal line 290b to the transport master 228. Accordingly, in normal, non-failover mode operation, the instance of the status packet containing the write confirmation generated by the second device 216 is not passed by the read multiplexer 292 (i.e., it is discarded). The instance of the status packet containing the write confirmation from the second device 216 provided to the decomposition block 272 of the transport slave 232 is deconstructed (step 352).

At step 356, the transport master 228 determines whether the data received from the system bus 224 was successfully stored in the first device 212. Similarly at step 360, the transport slave 232 determines whether that same data was successfully stored in the second device 216. The transport slave 232 may signal the transport master 228 that the data was successfully stored over the transport communication link 242. If the data has been successfully stored in both devices 212 and 216, a signal is sent to the host system 204 indicating that the write operation is complete (step 364). The system may then return to step 300 to await the receipt of additional commands or data.

If the write confirmation packet generated by the first device 212 indicates that the data was not successfully stored on the first device 212, the transport master 228 issues a notification to the host system 204 (step 368) that the operation failed. If the second device 216 indicates that the data it received was not stored successfully, the transport slave 232 signals the transport master 228 that the write operation to the second device 216 failed (step 372). In general, the transport slave 232 may provide the signal to the transport master 228 over the transport communication link 242. After receiving a signal from the transport slave 232 indicating that the write to the second device 216 was unsuccessful, the transport master 228 issues a notification to the host system 204 that the operation failed (step 368). The transport master 228 may also notify the host that the operation with respect to the second device 216 has not been completed if the transport slave 232 does not provide a signal to the transport master 228 within a predetermined amount of time (i.e. if the transport master 228 times out). After notification is provided to the host system 204 of the failure of an operation, the system returns to step 300 to await further instructions.

After receiving notification that an operation failed, the host system 204 may determine what further action is appropriate. For example, the host system 204 may order that the controller 208 make a second attempt at completing the operation, or the host system 204 may notify a user or system administrator of the failure. Furthermore, if the controller 208 provides no response to the host system 204 within a predetermined period of time, the host system 204 may read a status register associated with the transport master 228 to determine why no response was received.

Figure 4:
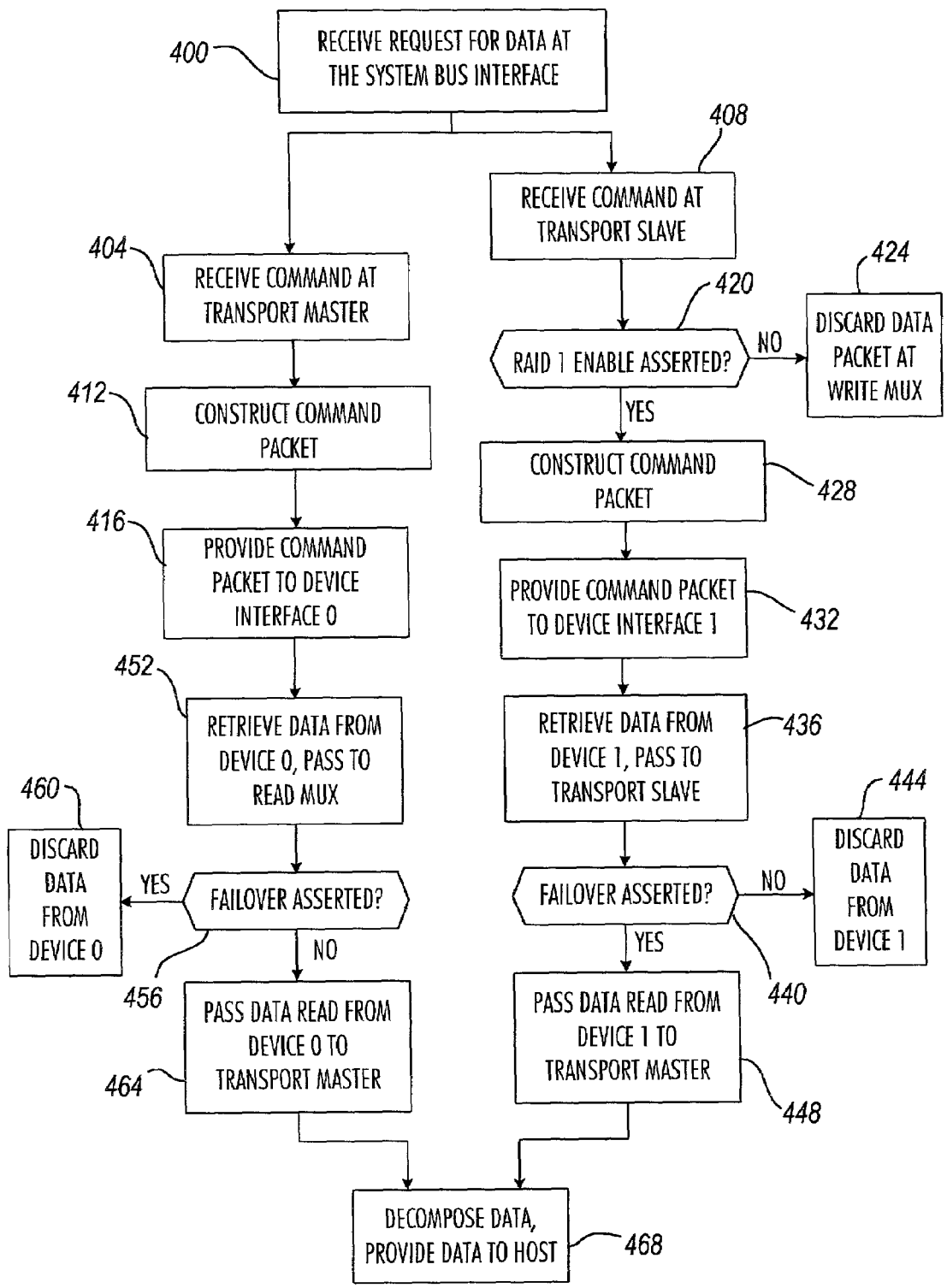
FIG. 4 is a flow chart illustrating the operation of an embodiment of the present invention in connection with a read operation.

With reference now to FIG. 4, a read operation in connection with a request for data addressed to the transport master 228 according to an embodiment of the present invention is described. Initially, at step 400, the request for data is received from the host system 204 at the system bus interface 236, and the request for data is passed to and received by the transport master 228 (step 404) and the transport slave 232 (step 408). With respect to the request received by the transport master 228, the construct block 260 constructs a command packet according to the communication and control protocol of the first device 212 containing the request (step 412). As in the example above, the command packet may include a frame information structure packet when the first device 212 is a serial ATA device. The command packet is then sent from the construct block 260 of the transport master 228 to the first device interface 244 (step 416).

With respect to the instance of the command containing the request for data received by the transport slave 232 (step 408), a determination is made as to whether RAID 1 operation has been enabled (step 420). For example, an instruction to enable RAID 1 operation may be stored in the register 240 and the contents of the register provided to the transport slave 232 by the register signal line 246. If RAID 1 operation is not enabled, the instance of the command received by the transport slave 232 is discarded (step 424).

If RAID 1 operation is enabled, the transport slave 232 constructs a properly formatted command packet (step 428) and passes the command packet containing the request for data to the second device interface 252 (step 432). The second device interface 252 provides the command packet containing the request for data to the second device 216. The requested data is then retrieved from the second device 216 and passed from the second device interface 252 to the decomposition block 272 of the transport slave 232 (step 436).

At step 440, a determination is made as to whether a failover signal is asserted on the failover signal line 298. The failover signal may be generated in response to a command from the host system 204 that sets the failover status in the register 240. The failover status may then be provided to each of the transport master 228, transport slave 232, and the read multiplexer 292. If no failover signal is asserted, the data received at the read multiplexer 292 from the second device interface 252 is not passed from the read multiplexer 292 to any other device (i.e. the data is discarded) (step 444).

If a failover signal is asserted, the requested data retrieved from the second device 216 is passed from the read multiplexer 292 to the decomposition block 264 of the transport master 228 (step 448). Accordingly, it can be appreciated that, in a failover mode, the data retrieved from the second device 216 is passed to the transport master 228.

At about the same time data is retrieved from the second device 216 (step 436), the requested data is retrieved from the first device 212 and passed to the read multiplexer 292 (step 452). At step 456, a determination is made as to whether a failover signal is asserted. If a failover signal is asserted, the read multiplexer 292 does not pass the data received from the first device to the transport master 228 (i.e. the data from the first device 212 is discarded) (step 460). If a failover signal is not asserted, the data read from the first device is passed to the decomposition block 264 of the transport master 228 (step 464).

At step 468, the data received at the decomposition block 264 of the transport master 228 is decomposed, and the retrieved data is provided to the host system 204 by the transport master 228. Accordingly, the transport master 228 can provide the host system 204 with requested data, whether or not a failover is asserted. Furthermore, it can be appreciated that the data is retrieved from both the first 212 and the second 216 devices, or an attempt to retrieve the data from both devices is made, regardless of whether failover is asserted. Following the provision of the requested data to the host system, confirmation that the requested data was successfully retrieved from the devices 212 and 216 is provided. See, e.g., steps 340–364 of FIG. 3 and the accompanying description for an example of the genertion of a status signal in the context of the storage of data. As can be appreciated by one of skill in the art, the status signal following the successful retrieval of data differs in that the devices 212 and 216 provide confirmation that the read operation was successful.

During normal RAID 1 operation, the transport slave 232 may monitor the data read from the second device 216 to ensure that the second device 216 is operating properly. If a problem retrieving data from the second device 216 is detected, the transport slave 232 may provide an appropriate signal to the transport master 228. Because a failure to retrieve data from the second device 216 compromises the data security provided by a RAID 1 array, the transport master 228 will typically signal the host system 204 when a problem with the second device 216 has been detected, so that remedial action can be taken. Because in normal RAID 1 enabled operation, the data provided to the host system 204 in response to a request for data originates from the first device 212, the host system 204 can continue to receive data from the first device 212, even in the event of a failure of the second device 216.

In the event of a failure of the first device 212, a failover mode may be entered. For example, the host system 204 may generate a failover enable signal if data is not successfully retrieved from the first device 212 in response to a request for such data. Furthermore, when a failure with respect to the first device 212 is initially detected, the host system 204 may reissue a command requesting the data in combination with assertion of the failover signal.

When the failover mode is entered, the read multiplexer 292 is switched so that the system host 204 is provided with data that was stored on the second device 216. This information is passed through the transport master 228, therefore the data is retrieved and provided to the system host 204 as if the devices 212 and 216 were operating normally. When the RAID 1 controller 208 is in failover mode, the failed first device 212 can be replaced even while the host system 204 retrieves data from the second device 216. After the first device 212 has been replaced, the data that was or should have been stored on the failed first device 212 can be written to the new first device 212 from the data stored on the second device 216.

The RAID 1 controller 208 may additionally provide a non-RAID 1 enabled, or second mode of operation. In the second mode of operation, the host system 204 may address data or commands to the transport master 228 and to the transport slave 232 individually. Accordingly, the transport master 228 and the transport slave 232 act upon only those individual data packets specifically addressed to them in the non-RAID 1 mode of operation. In addition, in the second mode of operation, the controller 208 acts as two independent controllers in connection with two independent devices 212 and 216. While in the non-RAID 1 operating mode, the system bus interface 236 serves to arbitrate requests for access to the system bus 224 by the transport master 228 and the transport slave 232. Accordingly, it can be appreciated that if independent operation of the devices 212 and 216 is desired, such operation may be enabled simply by de-asserting a RAID 1 enable signal and by addressing data or commands to the devices 212 and 216 individually. Assertion of the RAID 1 enable signal may be controlled by the host system 204.

According to another embodiment of the present invention, the controller 208 includes a local processor. The local processor may be used to control aspects of the operation of the controller 208 that might otherwise be controlled by the host processor 220 of the host system 204. For example, the local processor may control various functions of the RAID 1 controller 208, such as generating rewrite requests and selectively enabling a failover mode or a non-RAID 1 operating mode. In addition, all or certain of these functions may also be performed by a host system 204 in communication with the RAID 1 controller 208.

Although the device interfaces 244 and 252, the interconnections 248 and 256, and the devices 212 and 216 have been described as serial ATA devices, they are not so limited. For example, interfaces 244 and 252, the interconnections 248 and 256 and the devices 212 and 216 may comprise a small computer system interface (SCSI) or integrated drive electronics (IDE) interfaces. In general, any device interface protocol and associated components may be used to interconnect the devices 212 and 216 to the controller 208.

Furthermore, although the controller 208 has been described in connection with a single host system 204, it may be operated in connection with a plurality of host systems 204.

In another embodiment of the present invention, the read multiplexer 292 is not provided. Instead, when the controller 208 is in failover mode, data retrieved from the second device 216 is provided by the transport slave 232 to the system bus interface 236. Any data provided by the first device 212 to the transport master 228 is discarded.

From the foregoing discussion, it can be appreciated that the RAID 1 controller 208 of the present invention requires only a control signal to selectively operate in either a RAID 1 mode or a non-RAID 1 mode. Furthermore, it can be appreciated that the RAID 1 controller 208 of the present invention is capable of storing and retrieving data from a plurality of storage devices at substantially the same time.

Although the foregoing discussion has referred to the use of hard disk drives as the devices 212 and 216, the invention is not so limited. For instance, the devices 212 and 216 may include any device suitable for the storage of computer data, such as optical drives, tape drives, and three-dimensional storage devices. In addition, the present invention may be adapted for use with any even number of storage devices in parallel with single point to point connections to a device interface. Furthermore, the present invention is not limited to any particular communications protocol or interface for interconnecting computing devices, including computer peripherals.

The foregoing discussion of the invention has been presented for purposes of illustration and description. Further, this description is not intended to limit the invention to the form disclosed herein. Consequently, variations and modifications commensurate with the above teachings, within the skill and the knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for controlling data transfer between a host and a plurality of storage devices, comprising:
    receiving first data for storage at a transport master, wherein said first data for storage is addressed to said transport master;
    receiving said first data for storage at a transport slave, wherein said first data for storage is addressed to said transport master, and wherein said first data for storage is received at said transport master and said transport slave substantially simultaneously, plus or minus an arrival time difference due to a difference in length of a signal line traversed by said first data received at said transport master and the length of a signal line traversed by said first data received at said transport slave;
    providing from said transport master said first data for storage to a first storage device interface;
    providing from said transport slave said first data for storage to a second storage device interface, wherein said first data for storage is provided to said first device interface and to said second device interface substantially simultaneously, plus or minus an arrival time difference due to a difference in the length of a signal line traversed by said first data for storage provided to said first storage device interface and the length of a signal line traversed by said first data for storage provided to said second storage device interface, and plus or minus an arrival time difference due to a difference in a processing time of said first data for storage in said transport master and a processing time of said first data for storage in said transport slave;
    storing said first data for storage on a first storage device;
    storing said first data for storage on a second storage device;
    receiving a request for one of said first data and second data at said transport master, wherein said request for data is addressed to said transport master;
    receiving said request for one of said first data and second data at said transport slave, wherein said request for data is addressed to said transport master;
    providing from said transport master said request for one of said first data and second data to said first storage device interface;
    providing from said transport slave said request for one of said first data and second data to said second storage device interface; and
    in a normal operating mode, retrieving said requested one of said first data and second data from said first storage device and from said second storage device, wherein in said normal operating mode a multiplexer is controlled to connect said first storage device interface to said transport master such that said requested one of said first data and second data from said first storage device is provided to said transport master for delivery to said host and said multiplexer is controlled to not connect said second storage device interface to said transport master such that said requested one of said first data and second data from said second storage device is not provided to said transport master for delivery to said host; and
    in a failover operating mode, retrieving said requested one of said first and second data from at least said second storage device, wherein in said failover mode said multiplexer is controlled to connect said second storage device interface to said transport master such that said requested one of said first and second data from said second storage device is provided to said transport master and said multiplexer is controlled to not connect said first storage device interface to said transport master wherein any portion of said first and second data retrieved from said first storage device is not provided to said transport master.

2. The method of claim 1, wherein in a failover mode said requested one of said first data and second data from said first storage device is not provided to said host and said requested one of said first data and second data from said second storage device is provided to said host.

3. The method of claim 1, further comprising: in said normal operating mode:
    passing a write confirmation signal from said first storage device interface to said transport master; and
    passing a write confirmation signal from said second storage device interface to said transport slave.

4. The method of claim 1, further comprising:
    in said failover operating mode:
    passing a write confirmation signal from said first storage device interface to said transport master;
    passing a write failure signal from said second storage device interface to said transport slave;

providing said write failure signal to said transport master; and notifying said host of said write failure signal.

5. The method of claim 1, wherein in a non-RAID operating mode said data for storage and addressed to said transport master received at said transport slave is not stored on said second device.

6. The method of claim 1, wherein said step of providing said first data comprises constructing a data packet and providing said data packet to said first device interface and to said second device interface.

7. The method of claim 1, wherein said transport master and said transport slave are interconnected to a host system bus by a system bus interface.

8. The method of claim 1, wherein said method implements a RAID level 1 storage scheme.

9. A method for storing and retrieving data in a RAID 1 system, comprising:

enabling RAID 1 operation;

receiving first data for storage from a first communications bus at a system bus interface, wherein said data for storage is addressed to a transport master;

providing said data for storage to said transport master;

providing said data for storage to a transport slave;

storing said data in a first storage device and a second storage device;

receiving a request for said first data stored in both said first storage device and said second storage device;

in a normal mode:

in response to said request, retrieving data from said first and second storage devices, wherein said data retrieved from said first storage device is received by a multiplexer and is passed to said transport master by said multiplexer, wherein said data retrieved from said second storage device is passed to said transport slave and to said multiplexer, and wherein said data retrieved from said second storage device that is received by said multiplexer is not passed to said transport master; and validating said first data retrieved from said first and second storage devices to ensure data consistency between said first and second storage devices to ensure data consistency between said first and second storage devices; and in a failover mode:

in response to said request, attempting to retrieve data from said first storage device and retrieving data from said second storage device, wherein any data retrieved from said first storage device is received by said multiplexer and is not passed to said transport slave, and wherein data retrieved from said second storage device is passed to said transport slave and to said multiplexer, and wherein said data from said second storage device that is received by said multiplexer is passed to said transport master by said multiplexer.

10. The method of claim 9, wherein said step of enabling RAID 1 operation comprises enabling said transport slave to act on at least one of commands and data addressed to said transport master.

11. The method of claim 10, wherein a RAID 1 enable signal is provided to enable RAID 1 operation.

12. The method of claim 11, wherein said RAID 1 enable signal is generated by at least one of a host processor and a local processor.

13. The method of claim 9, wherein a request for data addressed to said transport master is provided to said transport master at substantially the same time that said request for data is provided to said transport slave.

14. A RAID controller, comprising:

a system bus interface;

a transport master interconnected to said system bus interface;

a first device interface interconnected to said transport master;

a first storage device directly interconnected to said first device interface;

a transport slave interconnected to said system bus interface; and a second device interface interconnected to said transport slave;

a second storage device directly interconnected to said second device interface, wherein at least one of a command and data addressed to said transport master and received at said system bus interface is passed to said transport master and is passed to said transport slave;

a multiplexer comprising a first input interconnected to said first device interface, a second input interconnected to said second device interface, and an output interconnected to said transport master, wherein said multiplexer selectively interconnects only one of said first and second inputs to said output at any one time, wherein data read from only said selected one of said first and second storage devices is provided by said multiplexer to said transport master;

wherein in a first operating mode data read from said first storage device is provided by said multiplexer to said transport master and data read from said second storage device is passed to said transport slave, and wherein in a second operating mode data read from said second storage device is provided by said multiplexer to said transport master and data read from said second storage device is passed to said transport slave.

15. The RAID controller of claim 14, wherein in a first mode of operation at least one of a command and data received at said transport master is provided to said first device interface and said at least one of a command and data received at said transport slave is provided to said second device interface.

16. The RAID controller of claim 15, wherein in a second mode of operation data received at said transport master is provided to said first device interface, and wherein said data received at said transport slave is not provided to said econd device interface.

17. The RAID controller of claim 14, wherein in a normal operating mode data read from said first storage device is provided to said multiplexer, wherein said data read from said first storage device is provided to said transport master, wherein data read from said second storage device is provided to said transport slave and to said multiplexer, and wherein said data read from said second storage device is not passed by said multiplexer to said transport master.

18. The RAID controller of claim 14, wherein in a failover mode data read from said first storage device is provided to said multiplexer, wherein said data read from said first storage device is not passed by said multiplexer to said transport master, wherein data read from said second storage device is provided to said transport slave and to said multiplexer, and wherein said data read from said second storage device is passed by said multiplexer to said transport master.

* * * * *